L. W. SIMMONS.
CULTIVATOR.
APPLICATION FILED JAN. 24, 1913.
1,107,856.
Patented Aug. 18, 1914.
2 SHEETS—SHEET 1.
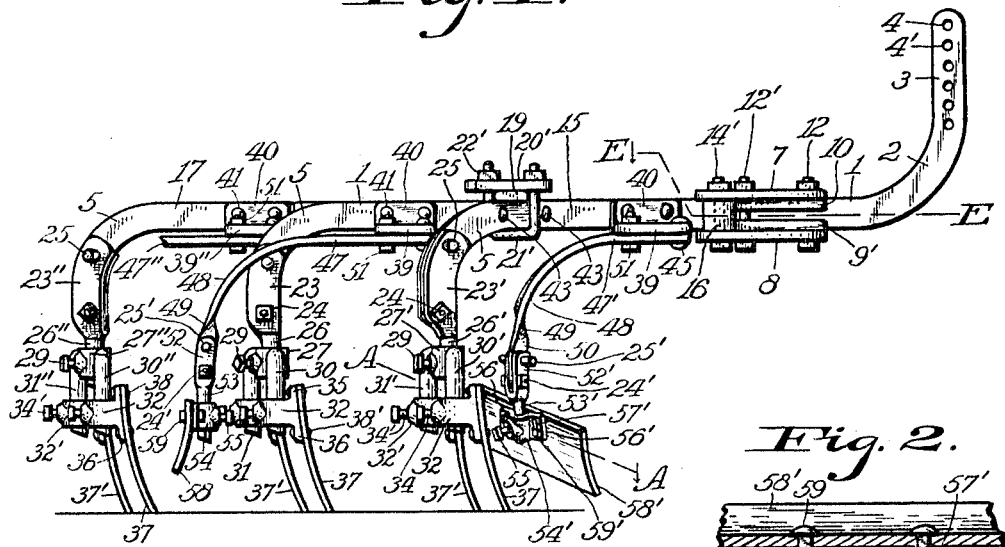
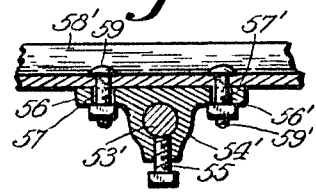
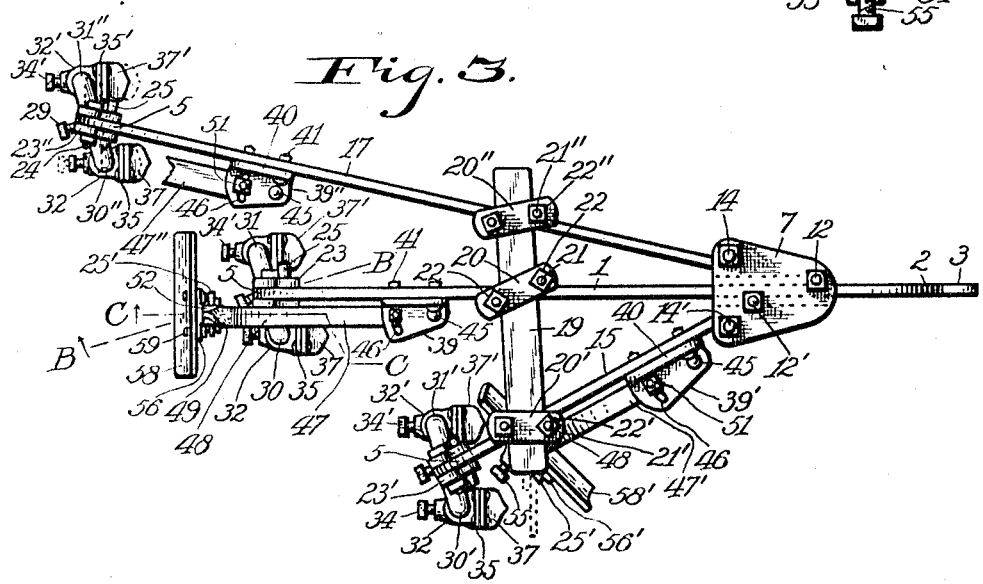
WITNESSES:
J. H. Gardner
M. J. Ridpath
INVENTOR:
Leroy W. Simmons,
BY E. T. Silvius,
ATTORNEY.

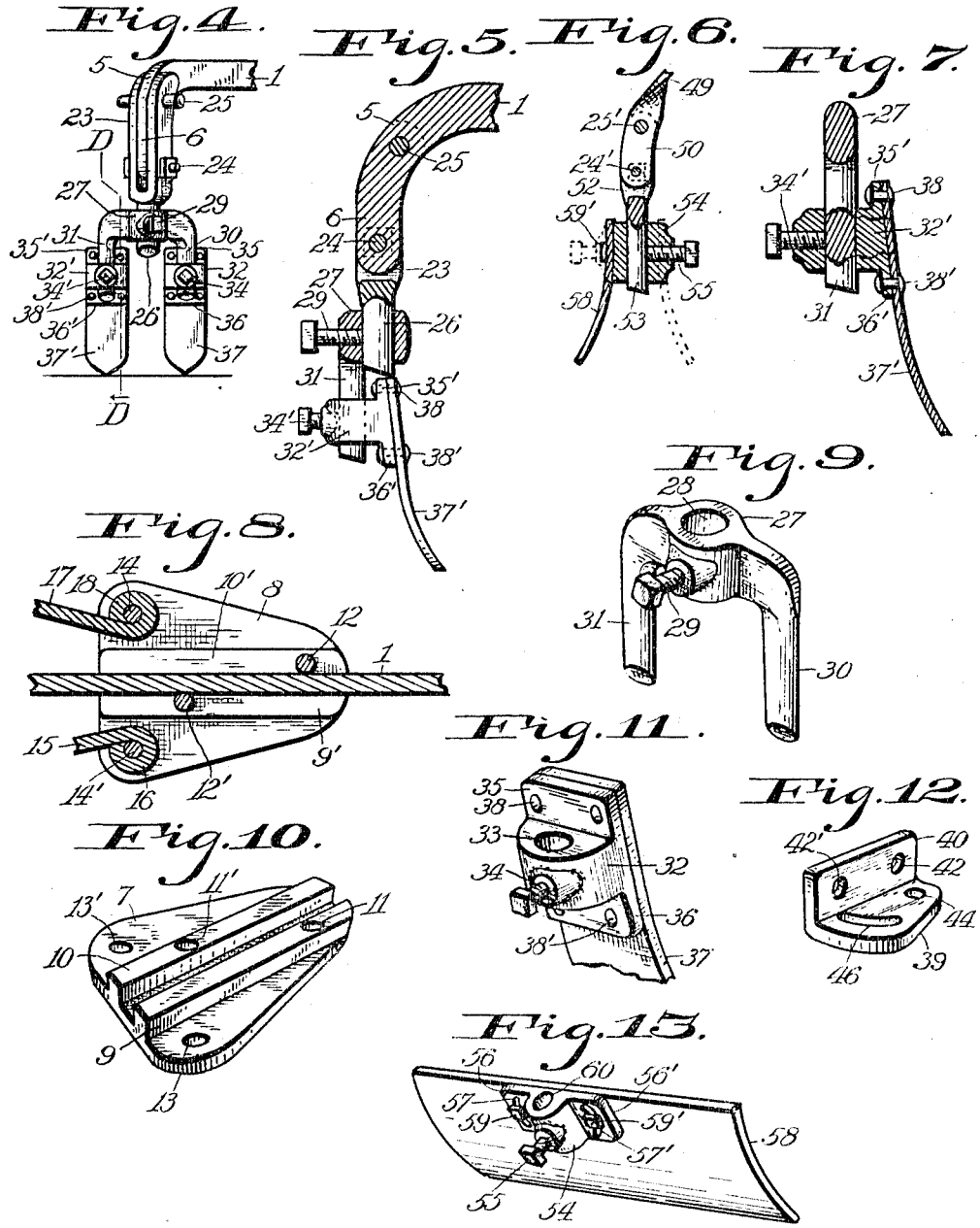

UNITED STATES PATENT OFFICE.

LEROY W. SIMMONS, OF BROAD RIPPLE, INDIANA.

CULTIVATOR.

1,107,856.

Specification of Letters Patent.

Patented Aug. 18, 1914.

Application filed January 24, 1913. Serial No. 743,936.

*To all whom it may concern:*

Be it known that I, LEROY W. SIMMONS, a citizen of the United States, residing at Broad Ripple, in the county of Marion and State of Indiana, have invented a new and useful Cultivator, of which the following is a specification, reference being had to the accompanying drawings and to the letters and figures of reference marked thereon.

This invention relates to the type of cultivator that has shovels or teeth and also scrapers for leveling the ground surface either in advance of or following the shovels or teeth in operation, the invention having reference more particularly to cultivator gang construction embracing features relating to the adjustability of position of the cultivating implements and the scrapers.

The object of the invention primarily is to provide an improved cultivator that shall be so constructed as to be highly efficient and capable of thoroughly cultivating under various conditions of operation, a further object being to provide improved means for connecting cultivator shovels or teeth to the gang frames of cultivators, and to provide improved means for connecting scrapers to the frames.

A still further object is to provide an improved cultivator gang frame that shall be so constructed as to permit adjustment of various parts thereof.

With the above mentioned and other objects in view, the invention consists in a cultivator gang comprising improved beams and arrangement thereof, improved means for connecting shovels or teeth to the beams, and improved means for connecting scraping blades to the beams; and the invention consists further in the novel parts and in the combinations and arrangements of parts as hereinafter particularly described and claimed.

Referring to the drawings, Figure 1 is a side elevation of a cultivator gang constructed substantially in accordance with the invention; Fig. 2, a fragmentary section on the plane of the line A A in Fig. 1; Fig. 3, a top plan of the improved cultivator; Fig. 4, a rear view of a portion of the cultivator gang; Fig. 5, a fragmentary section approximately on the line B B in Fig. 3; Fig. 6, a fragmentary section approximately on the line C C in Fig. 3; Fig. 7, a detail section approximately on the line D D in Fig. 4; Fig. 8, a fragmentary section on the line E E in Fig. 1; Fig. 9, a perspective view of one of the improved cultivator standard parts; Fig. 10, a perspective view of one of the beam parts; Fig. 11, a fragmentary perspective view of one of the cultivator shovels and its head; Fig. 12, a perspective view of one of the connecting parts of the improved gang frame; and Fig. 13, a perspective view of the improved scraper and its adjusting and supporting head.

Similar reference characters throughout the various figures of the drawings indicate corresponding elements or features of construction herein referred to.

A practical embodiment of the invention comprises a main beam 1 suitably adapted to be connected to a draft appliance or to a sulky so as to draw the beam in approximately horizontal position, the beam preferably having an upwardly curved portion 2 from which extends a vertical portion 3 provided with a suitable number of holes 4, 4', for draft purposes, this being the forward end portion. The beam has a downwardly extending curved portion 5 from which extends a standard portion 6. The forward portion of the beam is provided with a pivot head which preferably comprises two companion plates 7 and 8 provided respectively with guide ribs 9, 10 and 9', 10', one of the plates being placed upon the beam and the other plate beneath the beam so that the ribs embrace the vertical sides of the beam. The plates are provided with bolt holes 11, 11' that receive securing bolts 12 and 12' whereby the two plates are secured to the beam to constitute the pivot head. The plates are provided also with pivot holes 13 and 13' arranged on opposite sides of the beam and they receive a pair of pivots 14 and 14' in vertical arrangement. A relatively short companion or auxiliary beam 15 is provided and has an eye or hinge member 16 that is connected with the pivot 14', the beam extending therefrom rearwardly at an oblique angle to the main beam. A relatively longer companion or auxiliary beam 17 is provided and has on its forward end an eye or hinge member 18 that is connected to the pivot 14, the beam extending rearward farther than the rear end of the main beam obliquely to the latter. The comparison beams have also the curved portion 5 and downwardly extending standard portion 6, respectively similar to the standard portion of the main beam. A tie-bar 19 is placed upon the main beam and the two companion beams and is secured to the main beam by means of a clamp plate 20 and a U-bolt or yoke 21 provided with nuts 22. The companion beam 15 is secured adjustably to the tie-bar by means of a clamp plate 20' and a U-bolt or yoke 21' provided with nuts 22', so that the rear end of the beam may be adjustably held at different distances from the main beam. The companion beam 17 is secured to the tie-bar by means of a clamp plate 20" and a U-bolt or yoke 21" provided with nuts 22", this permitting the beam to be adjustably held at different distances from the main beam. Three standard parts 23, 23' and 23" are provided for the beams 1, 15 and 17 respectively, each part being connected to the standard portion 6 of its beam by means of a bolt 24 which permits of pivotal movement of the part which is normally prevented, however, by means of a wooden pin 25 that is driven through suitable pin holes in the part and the curved portion 5 of the beam, it being designed that the wooden pin shall break and permit pivotal movement of the part in case the cultivator shovels get caught against an unyielding obstruction. The several standard parts respectively have downwardly extending cylindrical portions or bars 26, 26' and 26" that constitute yielding rearward ends of the beams.

The three beams are provided respectively with yokes comprising body portions 27, 27' and 27" respectively, each having a bore 28 therein receiving the cylindrical bar, the body portion being provided with a set-screw 29 whereby it is adjustably secured to the bar, and each body portion has two stems comprising standard portions 30 and 31 thereon that normally extend downward in substantially vertical arrangement. Two suitable cultivator implements are mounted on the two stems of each yoke by means of two heads 32 and 32' having each a bore 33 therein that receives the stem, and the heads are provided respectively with set-screws 34 and 34' whereby they are adjustably secured to the stems. The two heads are provided with upwardly extending flanges 35 and 35' and downwardly extending flanges 36 and 36' to which cultivator shovels 37 and 37' are secured respectively by means of rivets 38 and 38' or otherwise as may be desired.

It will be seen from the foregoing that the yokes may be adjusted rotatively relatively to the beams so as to cause the shovels to plow more or less closely to a line, and the two shovels of each pair may be separately adjusted rotatively relatively to the yoke so that the shovels shall face either squarely forward or at oblique angles as may be desired.

Preferably each beam is provided with a scraper which, however, may be detached if desired, there being three lug plates 39, 39' and 39" secured to the beams 1, 15 and 17 respectively, each lug plate having a supporting flange 40 thereon that is placed against one side of the beam and secured thereto by means of bolts 41, each flange having bolt holes 42, 42' therein that receive the bolts. Each beam is provided with a suitable number of bolt holes 43 in different positions so that the lug plates may be placed at different positions on the beam to enable the beam to carry the scraper either forward or rearward of the shovels or teeth. Each lug plate has a pivot hole 44 in its forward portion provided with a pivot 45 and in its rearward portion has a curved slot 46 arranged concentrically to the pivot. Preferably three spring arms 47, 47' and 47" are provided that are connected to the pivots of the three lug plates respectively. Each spring arm is arranged flatwise and has a downwardly extending curved portion 48 and a twisted portion 49 from which extends an end portion 50 that normally is approximately at right angles to the supported portion of the arm, the latter portion being adjustably secured to the lug plate by means of a bolt 51 that extends through the curved slot in the plate. The spring arms have jaws 52 and 52' thereon respectively that are each secured thereto by a pivotal bolt 24' and a wooden pin 25', the pin being adapted to be broken under abnormal strains. The jaws 52 and 52' are provided respectively with downwardly extending cylindrical bars 53 and 53'. As illustrated the bar 53 is arranged vertically rearward of the shovels that are mounted on the main beam, the bar 53' being supported in advance of the shovels that are mounted on the shorter one of the companion beams for working near to a row of plants. Two scraper heads 54 and 54' are illustrated as being arranged in reverse order on the bars 53 and 53' respectively, each head being secured adjustably to the bar by means of a set screw 55, and each head has two lateral ears 56 and 56' provided with vertically arranged slots 57 and 57' respectively and to which two blades 58 and 58' are adjustably secured by means of bolts 59 and 59' extending through the slots respectively so that the blades may be supported by the heads either in horizontal or in slanting position, and each head has a bore 60 therein that receives the carrying bar or standard and permits the blade to be adjusted rotatively on the bar.

It should be understood that the companion gang usually employed for cultivating a broad strip of ground is constructed substantially as above described but with the longer and shorter companion beams transposed relatively to the main beam. It will be understood, also, that various modifications in the details of construction may be made within the scope of the accompanying claims, and that the gang may be guided and handled by any suitable or desired means.

When preparing the cultivator for use the companion beams may be spread out more or less from the main beam as may be desired and the pairs of shovels or teeth may be variously adjusted relatively to the separate beams, as illustrated in Fig. 3. The blade 58' also may be variously adjusted so as to scrape or draw stones or large lumps of earth away from the plants in advance of the cultivator shovels or teeth, and it will be understood that the scraper may be readjusted on the beam so that it shall follow the cultivator shovels, the blade 58 being illustrated in such position relative to the shovels of the main beam and in reverse order to the blade 58'. Other results in operation will be readily understood from the foregoing description of the structures and functions of the various parts of the cultivators.

Having thus described the invention, what is claimed as new is:—

1. A cultivator including a beam having a cylindrical bar thereon, a yoke adjustably secured to the bar to be shifted rotatively and having a cylindrical stem, and a cultivator implement having a head that is adjustably secured to be shifted rotatively on the stem.

2. A cultivator including a beam having a cylindrical bar thereon, a yoke adjustably secured to the bar to be shifted rotatively, the yoke having two cylindrical stems, and two cultivator implements having heads adjustably secured respectively to the two stems to be shifted rotatively thereon.

3. A cultivator including a cylindrical carrying bar having a jaw normally carrying the bar vertically, a yoke having a bore therein receiving the bar and having also a downward extending cylindrical stem, a head having a bore therein receiving the stem, a set-screw connected to the yoke and engaging the bar, a set-screw connected to the head and engaging the stem, and an implement fixedly secured to the stem and extending downward therefrom at an inclination to the stem.

4. A cultivator including a yoke having two cylindrical stems, all formed integrally, the stems extending in parallel arrangement, the yoke having also a bore therein on a plane extending between the stems, a carrying bar rotatively adjustable in the bore and having a supporting jaw thereon, a set-screw mounted in the yoke and engaging the bar, and two cultivator implements having heads adjustably secured respectively to the two stems.

5. A cultivator including a cylindrical carrying bar having a jaw normally carrying the bar vertically, a yoke having a bore therein receiving the bar and having also two integral downward extending cylindrical stems thereon, a device adjustably securing the yoke to the bar, two heads having bores receiving the two stems respectively and provided each with a device adjustably securing the head to the stem, and two cultivator implements fixedly secured to the two heads respectively.

6. In a cultivator, the combination of a vertically supported cylindrical bar, a yoke rotatively adjustable on the bar and having a set screw therein securing the yoke fixedly to the bar, the yoke having two integral cylindrical stems on opposite sides of the bar, two shovel heads rotatively adjustable independently on the two stems respectively and having set screws therein fixedly securing the heads to the stems, each head having two ears and two cultivator implements fixedly secured to the ears of the two heads respectively.

7. In a cultivator, the combination of a main beam having a downward extending cylindrical standard portion, two auxiliary beams of different length pivotally connected to opposite sides respectively of the main beam to be adjustably moved toward or from the main beam, each auxiliary beam having a downward extending cylindrical standard portion thereon, means for rigidly securing the auxiliary beams relatively to the main beam, a plurality of yokes, one for each standard portion and having a bore therein between its ends receiving said portion, the yoke being rotatively adjustable on said portion and having two downward extending stems on its end portions extending on opposite sides respectively of the standard portion, a device for adjustably securing the yoke to the standard portion, and a plurality of pairs of plowing cultivator implements mounted on the stems of the yokes, one to each stem and radially adjustable relative to the yoke.

In testimony whereof, I affix my signature in presence of two witnesses.

LEROY W. SIMMONS.

Witnesses:
  E. T. SILVIUS,
  J. H. GARDNER.